United States Patent
Lee et al.

(10) Patent No.: US 7,664,261 B2
(45) Date of Patent: Feb. 16, 2010

(54) ENCRYPTION PROCESSOR (75) Inventors: Seungyoup Lee, Seoul (KR); Minsik Lee, Seoul (KR); Sungwoo Lee, Yongin-si (KR)

(73) Assignee: BSTECH Co. Ltd., Seoul (KR)

( * ) Notice: Subject to any disclaimer, the term of this patent is extended or adjusted under 35 U.S.C. 154(b) by 189 days.

(21) Appl. No.: 10/575,482

(22) PCT Filed: Dec. 1, 2005

(86) PCT No.: PCT/KR2005/004074
§ 371 (c)(1),
(2), (4) Date: Apr. 12, 2006

(87) PCT Pub. No.: WO2006/059873
PCT Pub. Date: Jun. 8, 2006

(65) Prior Publication Data
US 2008/0260148 A1   Oct. 23, 2008

(30) Foreign Application Priority Data
Dec. 1, 2004  (KR) .................. 10-2004-0099697
Oct. 31, 2005  (KR) .................. 10-2005-0103140

(51) Int. Cl.
H04N 7/167 (2006.01)
G06F 12/14 (2006.01)
H04L 9/32 (2006.01)
G09C 5/00 (2006.01)

(52) U.S. Cl. ................ 380/200; 380/30; 380/54; 713/178; 713/192; 713/193

(58) Field of Classification Search ............ None
See application file for complete search history.

(56) References Cited

U.S. PATENT DOCUMENTS

| 4,603,381 A | 7/1986 | Guttag |
| 6,272,127 B1 * | 8/2001 | Golden et al. .............. 370/352 |
| 6,434,699 B1 | 8/2002 | Jones et al. |
| 6,898,285 B1 * | 5/2005 | Hutchings et al. .......... 380/200 |
| 6,992,711 B2 * | 1/2006 | Kubo .................... 348/231.7 |
| 7,484,247 B2 * | 1/2009 | Rozman et al. .............. 726/34 |
| 2003/0149884 A1 * | 8/2003 | Hernandez et al. ......... 713/193 |
| 2005/0195975 A1 * | 9/2005 | Kawakita ................... 380/30 |

* cited by examiner

Primary Examiner—Kaveh Abrishamkar
(74) Attorney, Agent, or Firm—Ladas & Parry LLP

(57) ABSTRACT

One chip encryption processor is disclosed, in which a password process unit for processing a data encryption and an interface for managing a password needed for an encryption are integrated into one chip. The encryption processor includes an encryption interface for connecting an externally connected apparatus and an internal data process apparatus, a password process unit for encrypting the inputted data, a memory unit for temporarily storing the data. The above elements are integrated into one chip, so that a desired data security, non-error operation and stable user verification are obtained.

12 Claims, 7 Drawing Sheets

ENCRYPTION PROCESSOR

TECHNICAL FIELD

The present invention relates to an encryption processor, and in particular to an improved encryption processor in which an encryption processor for encryption and an interface for a password management needed for encryption are integrated into one chip.

BACKGROUND ART

As various digital apparatuses are adapted, the use of a DSP (Digital Signal Processor) increases, which is capable of more efficiently processing a digital signal in real time as compared to a micro-controller provided so as to control a microprocessor or a certain apparatus. The DSP is a kind of a microprocessor which includes a hardware-based multiplier capable of performing calculation at a very high speed in real time in a digital signal process field. Based on their internal structures, the DSP may be classified into a universal type DSP simply formed of a DSP core, and an exclusive type DSP having an input and output (I/O) function and a control program stored in a DSP core, with the input and output function and control program being proper to an audio process, a communication process, an image process, a digital control, and a high speed calculation. Recently, a micro-controller type DSP having a micro-controller DSP has been developed for the use in a certain digital apparatus. The above DSP has improved parallel process, multiple processing functions and communication functions, so that the field of its use is expanded.

The most serious problems lying in the use of digital data by almost apparatuses are a security problem such as data duplication, modulation and hacking. The DSP is well adapted to the process and communication of a digital data but is not capable of directly overcoming the security problems such as digital data duplication, modulation and hacking. Therefore, an additional security module is installed at each digital apparatus which uses the DSP.

However, in the case that data are modulated or hacked in other regions, not in a specific region, the security function does not work, so that the data may be leaked when monitoring an internal data transfer path.

DISCLOSURE OF INVENTION

Technical Solution

Accordingly, it is an object of the present invention to provide an encryption processor which overcomes the problems encountered in the conventional art.

It is another object of the present invention to provide an encryption processor in which an encryption module capable of encrypting a digital data is integrated in one chip.

It is further another object of the present invention to provide an encryption processor which includes an interface capable of externally receiving a certain password needed for a data encryption.

It is still further another object of the present invention to provide an encryption processor in which an encryption module capable of encrypting a digital data and a data process module capable of processing a digital data are integrated in one processor.

To achieve the above objects, there is provided an encryption processor, comprising an encryption processor which connects an externally connected data input and output apparatus and an internal data process apparatus and mediates a communication between the same; a password process unit which encrypts an externally inputted data based on a certain encryption algorithm; and a memory unit which stores a program corresponding to the encryption algorithm and temporarily stores a data generated during an encryption process, wherein the above encryption processor, password process unit and memory unit are integrated into one independent chip.

Preferably, the encryption processor according to the present invention may further includes an encryption controller which externally receives a signal with respect to the operation state of the password process unit for thereby controlling an operation of the password process unit.

The encryption processor according to the present invention further may include a communication module for transferring an internally converted data or a generated data through an internally connected communication network.

Preferably, the password process unit detects an externally received abnormal signal and deletes a certain data for a data encryption corresponding to the abnormal signal receipt and an encrypted video data.

BEST MODE FOR CARRYING OUT THE INVENTION

Figure 1:
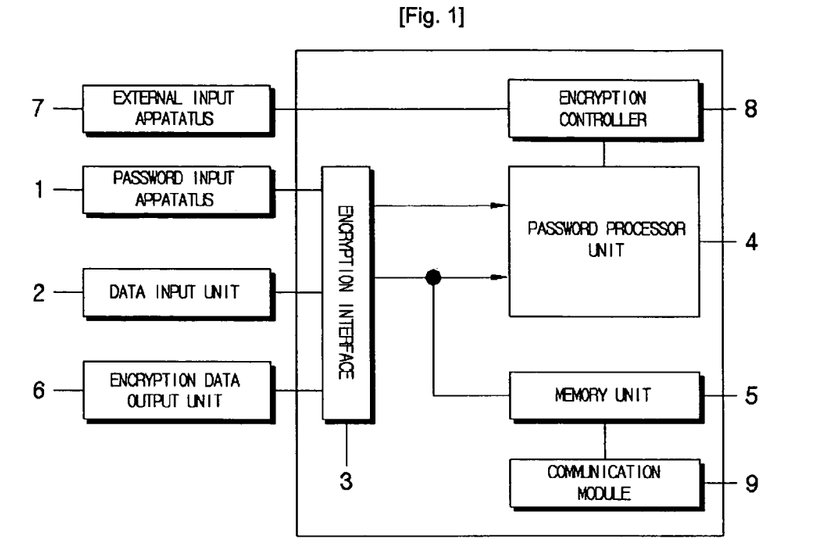
FIG. 1 is a view illustrating a construction of an encryption processor according to a first embodiment of the present invention.

FIG. 1 is a view illustrating a construction of an encryption processor according to a first embodiment of the present invention. As shown in FIG. 1, an encryption processor according to a first embodiment of the present invention includes an encryption interface 3, a password processor unit 4, memory unit 5, encryption controller 8, and a communication module 9. The encryption processor according to a first embodiment of the present invention also includes a data input unit 2 for inputting an original data which needs an encryption, a password input unit 1 which receives a password, for example, a personal identification number (PIN), needed for encryption, an encryption data output unit 7 which receives encrypted data from the encryption processor and outputs the same, and an external input apparatus 7 in communication with the encryption controller 8.

The encryption interface 3 converts the data inputted from the data input unit 2 and the password input unit 1 connected with the encryption processor into the data, which can be recognized by the password process unit 4 or the memory unit 5. The encryption interface 3 converts the data processed by the password process unit 4 or the memory unit 5 into the data which can be recognized by the encryption data output unit 6.

The password processor unit 4 receives a password, which is needed for a data code verification, from the externally connected password input unit 1 and creates a verification data and encrypts the original data based on a certain encryption algorithm.

Preferably, the password process unit 4 creates a password needed for a data encryption through the encryption interface 3 in communication with the password input unit 1.

Preferably, the encryption algorithm may be SEED, DES (data encryption standard), IDEA, RC2 and RC5.

The password process unit 4 detects an externally inputted abnormal signal (for example, over voltage or unstable frequency) and preferably deletes an encrypted data in response to the abnormal signal, and a session key, master key or verification data temporarily stored in the memory unit 5 during the encryption process.

The memory unit 5 includes a ROM, flash memory or EEPROM which store a certain program corresponding to a certain encryption algorithm processed by the password process unit 4, and a RAM, flash memory or EEPROM which store a data generated during the encryption process.

Preferably, the encryption processor according to the present invention may further include an encryption control apparatus 8. The encryption control apparatus 8 controls an operation of the password process unit 4 by receiving an encryption ON/OFF signal from the external input apparatus 7.

More preferably, the encryption control apparatus 8 can control the size of the password (for example, personal identification number) used for encryption and can control the selection of the encryption mode (for example, EBC (Electronic Code Book), CBC(Cipher Block Chaining), CFB (Cipher Feed Back), OFB (Output Feed Back)) when the password process unit 4 uses a plurality of encryption modes.

In addition, the encryption processor according to a first embodiment of the present invention further includes a communication module 9 which transfers an encrypted data by the password process unit 4 through an externally connected wired or wireless communication network.

In the second through sixth embodiments of the present invention, there is provided an encryption processor in which an encryption module for encrypting a digital data and a video process module for processing a digital video data are integrated in one processor. Since the process of the digital video data is generally used in the digital camera, in the second through sixth embodiments of the present invention, the encryption processor is included in the digital camera. In the second through sixth embodiments of the present invention, though the encryption processor is adapted to the digital camera, the present invention is not limited to the above construction. Various equivalents and modifications, which could substitute the above construction, may be adapted.

Figure 2:
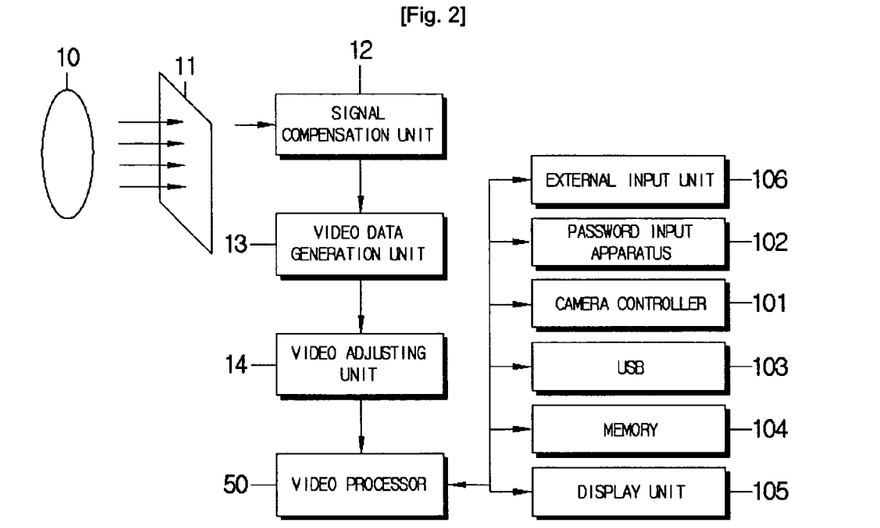
FIG. 2 is a view illustrating a construction of a digital camera according to a second embodiment of the present invention.

FIG. 2 is a view illustrating a construction of a camera according to a second embodiment of the present invention. As shown therein, the camera according to a second embodiment of the present invention includes an optical system 10, a CCD (Charge Coupled Device) 11, a signal compensation unit 12, a video data generation unit 13, a video adjusting unit 14 and an encryption processor 50.

The optical system 10 is formed of at least one convex lens or at least one concave lens and receives a reflection light reflected by an object, so that an image is focused at the charge coupled device 11.

The CCD 11 is formed of a plurality of pixels and converts the reflection light incident at each pixel into electrical signals through the optical system 10. The CCD 11 includes charge coupled devices or a complementary metal oxide semiconductor (CMOS).

The signal compensation unit 12 adjusts a voltage level V of an electrical signal outputted from each pixel and removes noises.

The video data generation unit 13 generates luminance Y and color differences Cb and Cr of the object through the processor which converts the electric signal into video data.

The video adjusting unit 14 checks a recording environment including the focus, exposure and lighting of the video data and controls the optical system 190, the CCD 11 or the signal compensation unit 12.

The encryption processor 50 is provided in a type of an independent chip and converts the video data including the luminance and color difference signals of the object into video data having a format such as AVI or MPEG through a data encoding process.

The encryption processor 50 is formed of a single chip for a video data process and converts the video data into an encrypted video data through a certain encryption algorithm.

The digital camera according to a second embodiment of the present invention further includes a camera controller 101 for controlling an operation of a camera, a password input apparatus 102 for inputting a password (for example, personal identification number), a USB (Universal Serial Bus) 103 for transferring the data outputted from the encryption processor 50, a memory unit 104 for storing the data outputted from the processor 50, and a display unit 105 for displaying the data outputted from the processor 50. The above-described elements 101, 102, 103, 104 and 105 are connected with the encryption processor 50.

Figure 3:
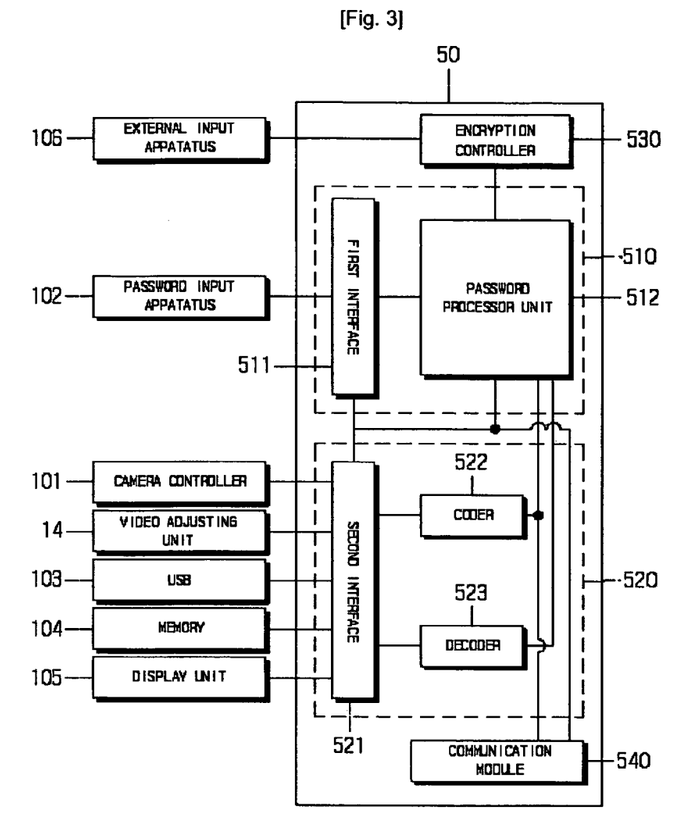
FIG. 3 is a view illustrating a construction of an encryption processor provided at a digital camera according to a second embodiment of the present invention.

FIG. 3 is a view illustrating a construction of the encryption processor 50 according to a second embodiment of the present invention. As shown therein, the encryption processor 50 according to a second embodiment of the present invention is formed of a single chip and includes an encryption module 510, and a video process module 520.

Here, the encryption module 510 includes a first interface 511 for managing the connections of a password input apparatus 102 which includes a body information recognition apparatus for inputting body information including a user's fingerprint information, voice information or iris information, a key pad for inputting a password (for example, PIN), and an IC card for storing password (for example, PIN). The encryption module 510 further includes a password process unit 512 for decoding the encrypted video data.

The password process unit 512 encodes or decodes the video data based on an encryption algorithm such as SEED, DES (Data Encryption Standard), IDEA, RC2, RC5, etc.

The password process unit 512 preferably deletes a data (for example, a video data, an encrypted session key and a personal key) temporarily stored for encryption when a certain signal occurring due to a physical attack with respect to the encryption processor 50 is received or a certain signal occurring due to an abnormal connection (for example, over voltage or unstable frequency) is received. It is possible to prevent any leakage of the password (for example, PIN) needed for encryption by deleting a data (video data, encrypted session key and personal key) which is temporarily stored during the encryption with respect to the physical attach.

Preferably, the password process unit 512 can generate a password used for a data encryption in communication with the password input apparatus 102 through the first interface 511.

The key data inputted through the password input apparatus 102 is preferably directly transferred to the encryption module 510, not through the camera controller 101 which drives the digital camera. It is possible to prevent any leakage of the password (for example, PIN) by directly transmitting the key data to the encryption module 510.

The video process module 520 includes a second interface 521 which manages the connections of the input and output apparatuses including a camera controller 101, a USB 103, a memory 104, a display unit 105 and a video adjusting unit 14. The video process module 520 further includes a coder 522 for compressing the video data in a certain format, and a decoder 523 which decompresses the compressed video data.

The coder 522 is adapted to a program capable of encoding the video data into a certain format. The above format may be formed of JPEG, AVI or MPEG. Therefore, the video data is converted into the format such as JPEG, AVI or MPEG.

The decoder 523 adapts the video data converted into the format of JPEG, AVI or MPEG to a decoding program corresponding to the encoding program processed by the coder 522. The video data converted into the formation of JPEG, AVI or MPEG is decoded to the original video data before the encoding.

Preferably, an externally received video data can be directly transferred to the password process unit 512 through the second interface 521, and the encrypted video data can be externally transferred through the second interface 521. In this embodiment of the present invention, the video data is transferred to the password process unit 512 through the second interface 521. The present invention is not limited thereto. For example, the video data may be transferred to the password process unit 512 through the second interface 521 and the first interface 511.

Preferably, the encryption processor according to the present invention may further include an encryption controller 530. The encryption controller 530 receives an encryption ON/OFF signal from the external input apparatus 106 and controls the operation of the password process unit 512.

More preferably, the encryption controller 530 controls the size of the password (for example, personal key) used for encryption. When the password process unit 512 uses a plurality of encryption modes, the encryption controller 530 can control the selection of the encryption modes such as EBC (Electronic Code Book), CBC (Cipher Block Chaining), CFB (Cipher Feed Back), OFB (Output Feed Back).

In addition, the encryption processor according to the embodiment of the present invention further includes a communication module which transfers an encrypted data by the password process unit 512 through an externally connected wired and wireless communication network.

The operation of the digital camera according to a second embodiment of the present invention will be described.

A reflection light reflected by an object is incident through the optical system 10. The incident reflection light is focused at the CCD 11. The CCD 11 generates an electrical signal corresponding to the reflection light formed at the CCD 11, and the electrical signal is transferred to the signal compensation unit 12.

Noises are removed from the electrical signal by the signal compensation unit 12, and the noise-removed electrical signal combines luminance and color difference signals incident at each pixel through the video data generation unit 13 for thereby generating a video data.

The video data is compared with a reference value with respect to the recording environment information including focus, exposure and lighting through the video adjusting unit 14 and is compensated to the optimum video data. At this time, the video adjusting unit 14 controls the operation of the optical system 10, the CCD 11 or the signal compensation unit 12 for compensation to the video data.

The video data compensated by the video adjusting unit 14 are transferred to the video process module 520 provided at the encryption processor 50. The video data are transferred to the coder 522 through the second interface 521 of the video process module 520 and are adapted to the program which encodes into a certain compression format. Therefore, the video data are encoded into the format such as JPEG, AVI or MPEG.

The coded video data are transferred to the password process unit 512 and encrypted through a certain encryption algorithm and is stored in the memory connected with the second interface 521. So as to encrypt the video data, the encryption algorithm such as SEED, DES (Data Encryption Standard), EDEA, RC2, RC5, etc. may be adapted.

The password process unit 512 receives a password (for example, personal key) from the password input apparatus 102 including a key pad, an IC card or a body recognition apparatus and executes a hash function (algorithm) based on the above password (for example, personal key) for thereby calculating a hash value. The encryption may be performed using the password (for example, personal key) which has the hash value for thereby generating a verification data. The verification data is attached to the encrypted video data and is used for the verification of the video data.

In the encryption process of the video data, when the encryption control apparatus 530 receives an encryption OFF signal from the external input apparatus 106, the encryption control apparatus 530 stops the operation of the password process unit 512. Therefore, the video data outputted from the encryption processor 50 is the data which is not encrypted.

When the camera controller 101 requests a certain video data display to the display unit 105, the video data stored in the memory 104 are transferred to the password process unit 512 through the second interface 521. The video data are processed with the decoding algorithm corresponding to the encoding algorithm of the password process unit 512 for thereby decoding the encrypted video data.

The decrypted video data is transferred to the decoder 523 and is adapted to a compression algorithm of the coder 522 and is converted into a video data formed of luminance and color difference signal and is displayed on the display unit 105 through the second interface.

Figure 4:
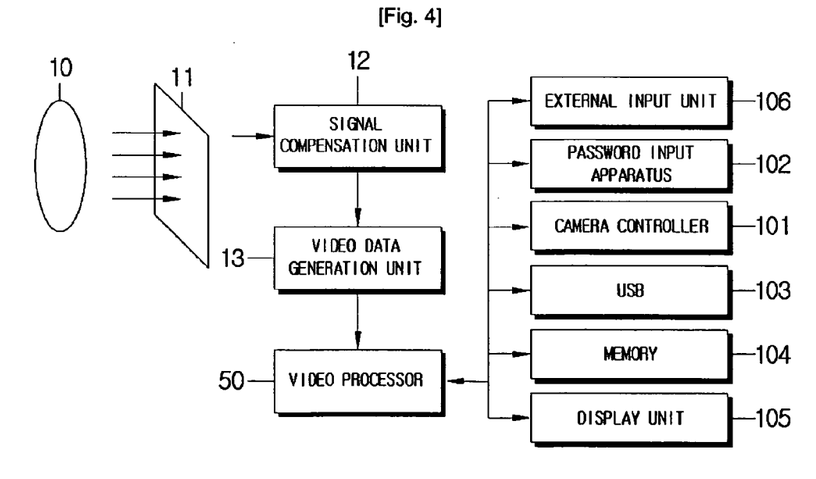
FIG. 4 is a view illustrating a construction of a digital camera according to a third embodiment of the present invention.

FIG. 4 is a view illustrating a construction of the camera according to a third embodiment of the present invention. As shown therein, the camera according to a third embodiment of the present invention includes an optical system 10, a CCD 11, a signal compensation unit 12, a video data generation unit 13 and an encryption processor 60.

The optical system 10, the CCD 11, the signal compensation unit 12 and the video data generation unit 13 of FIG. 4 are the same as the optical system 10, the CCD 11, the signal compensation unit 12 and the video data generation unit 13 of FIG. 2 are same in their structures and functions, the same reference numerals are provided to the same elements.

Therefore, the detailed descriptions of the optical system 10, the CCD 11, the signal compensation unit 12 and the video data generation unit 13 will be referred to the second embodiment of the present invention and will be omitted.

The encryption processor 60 is formed of an independent chip and checks the recording environment including focus, exposure and lighting of the video data and controls the optical system 10, the CCD 11 or the signal compensation unit 12. The encryption processor 60 converts the video data including luminance and color difference signal of the object into the video data having a certain format such as AVI or MPEG through the data encoding process and converts the video data into the encrypted video data through a certain encryption algorithm.

Figure 5:
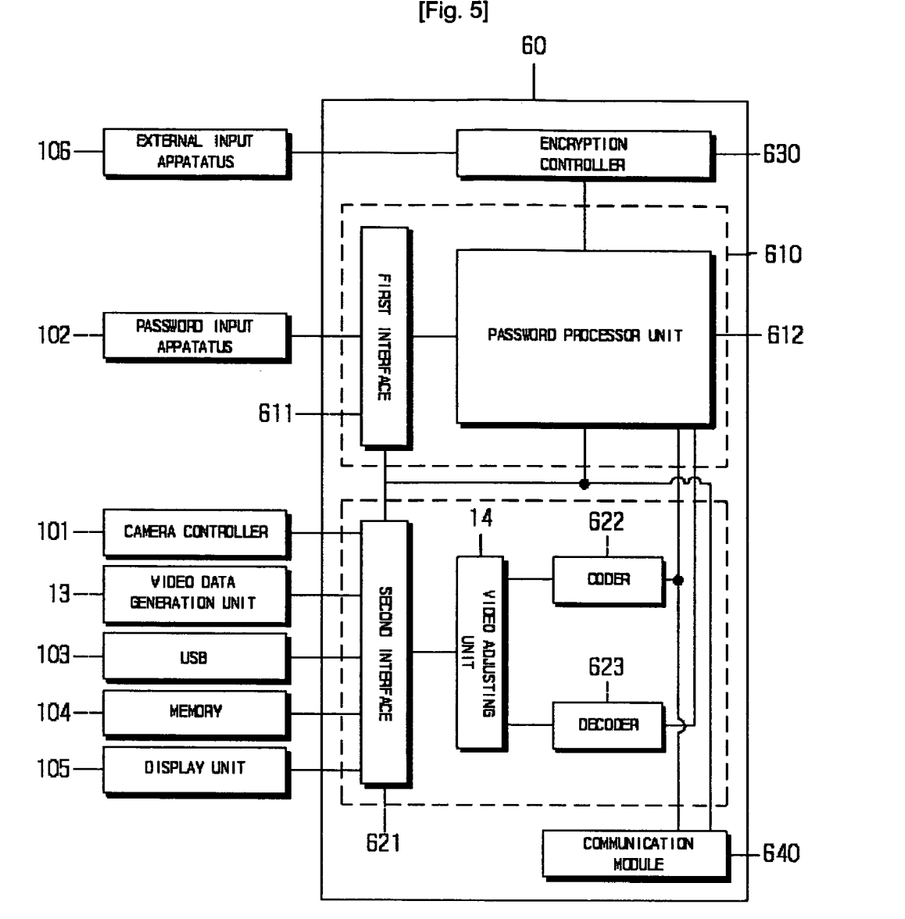
FIG. 5 is a view illustrating a construction of an encryption processor provided at a digital camera according to a third embodiment of the present invention.

FIG. 5 is a view illustrating a construction of an encryption processor 60 provided at a digital camera according to a third embodiment of the present invention. As shown therein, the encryption processor 60 according to a third embodiment of the present invention is formed of a single chip and includes an encryption module 610 and a video process module 620.

The encryption module 610 of FIG. 5 is the same as the encryption module 510 of FIG. 3 in their constructions and functions. Therefore, the detailed descriptions of the encryption module 610 will be referred to the encryption module 510 of FIG. 3 and will be omitted.

The video process module 620 includes a second interface which manages the connections of the input and output apparatus including a second interface 621 which includes a camera controller 101, a memory 104, a USB 103, a display unit 105 and a video data generation unit 13. The video process module 620 further includes a video adjusting unit 14 which adjusts the recording environment including focus, exposure and lighting of the video data, and a decoder 623 which decrypts the compression of the compressed video data.

The encryption processor 60 according to a third embodiment of the present invention further includes a video adjusting unit 14 provided in the second embodiment of the present invention and is formed of a single chip. The remaining constructions are the same as the second embodiment of the present invention in their basic functions and structures except for the above difference construction.

Figure 6:
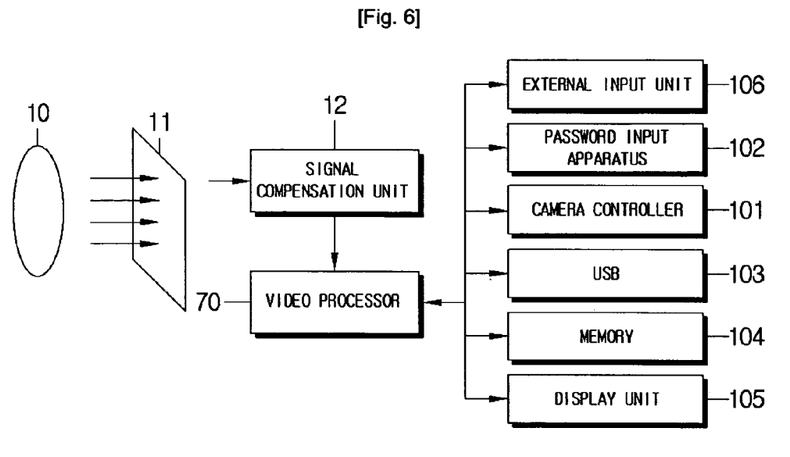
FIG. 6 is a view illustrating a construction of a digital camera according to a fourth embodiment of the present invention.

FIG. 6 is a view illustrating a construction of a camera according to a fourth embodiment of the present invention. As shown therein, the camera according to a fourth embodiment of the present invention includes an optical system 10, a CCD 11, a signal compensation unit 12 and an encryption processor 70.

The optical system 10, the CCD 11 and the signal compensation unit 12 of FIG. 6 are the same as the optical system 10, the CCD 11 and the signal compensation unit 12 of FIG. 12 in their structures and functions. Therefore, the same reference numerals are provided to the same elements. The detailed descriptions of the optical system 10, the CCD 11 and the signal compensation unit 12 will be referred to the second embodiment of the present invention and will be omitted.

The encryption processor 70 is formed of a single chip and converts an electrical signal from the signal compensation unit 12 into a video data and checks a recording environment including focus, exposure and lighting of the video data and controls the operation of the optical system 10, the CCD 11 or the signal compensation unit 12. The encryption processor 70 converts the video data including luminance and color difference signal of an object into a video data having a format such as AVI or MPEG through a data encoding process and converts the video into an encrypted video data through a certain encryption algorithm.

Figure 7:
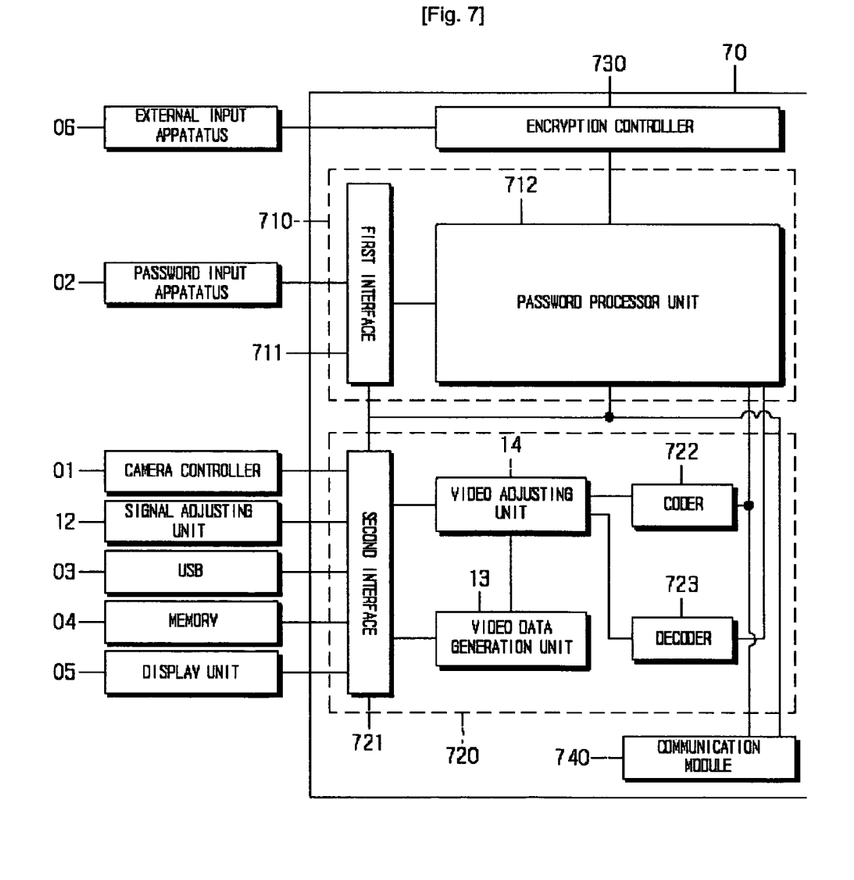
FIG. 7 is a view illustrating a construction of an encryption processor provided at a digital camera according to a fourth embodiment of the present invention.

FIG. 7 is a view illustrating a construction of an encryption processor 70 provided at a digital camera according to a fourth embodiment of the present invention. As shown therein, the encryption processor 70 according to a fourth embodiment of the present invention is formed of a single chip and includes an encryption module 710 and a video process module 720.

The encryption module 710 of FIG. 7 is the same as the encryption module 510 of FIG. 3 in their constructions and functions. Therefore, the detailed descriptions of the encryption module 710 will be referred to the encryption module 510 of FIG. 3 and will be omitted.

The video process module 720 includes a second interface 721 which manages the connection of the input and output apparatus including a camera controller 101, a memory 104, a USB 103, a display unit 105 and a signal compensation unit 12. The video process module 720 further includes a video data generation unit 13 which converts the electrical signal from the signal compensation unit 12 into a video data including luminance and color difference signal of an object, a video adjusting unit 14 which adjusts the recording environment including focus, exposure and lighting of the video data, a coder 622 which compresses the video data into a certain format, and a decoder 623 which decompresses the compressed video data.

Namely, the encryption processor 70 according to a fourth embodiment of the present invention includes a video data generation unit 13 and a video adjusting unit 14 and is formed of an independent chip. The basic functions and structures of the fourth embodiment of the present invention are the same as the second embodiment of the present invention except for the above different structures.

Figure 8:
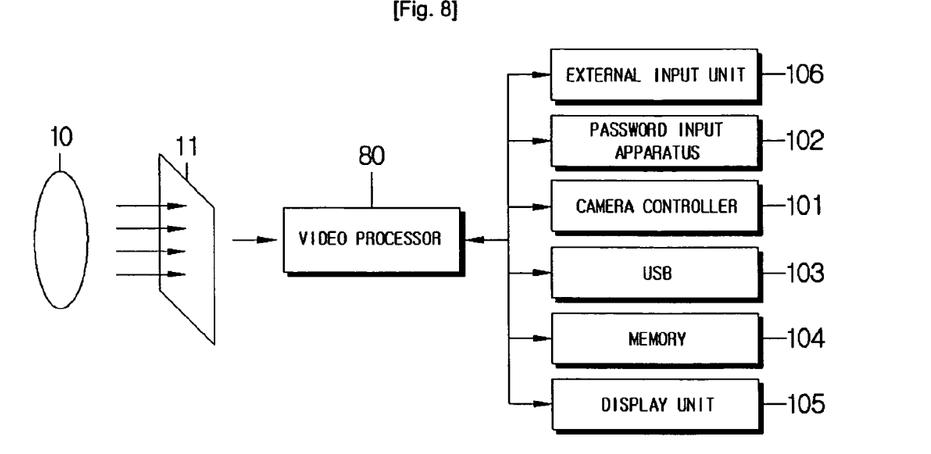
FIG. 8 is a view illustrating a construction of a digital camera according to a fifth embodiment of the present invention.

FIG. 8 is a view illustrating a construction of a camera according to a fifth embodiment of the present invention. As shown therein, the camera according to a fifth embodiment of the present invention includes an optical system 10, a CCD 11 and an encryption processor 80.

Since the optical system 10 and the CCD 11 of FIG. 8 are the same as the optical system 10 and the CCD 11 of FIG. 2, the same reference numerals are given. Therefore, the detailed descriptions of the optical system 10 and the CCD 11 will be referred to the second embodiment of the present invention and will be omitted.

The encryption processor 80 is formed of an independent chip and removes the noises from the electric signals from the CCD 11 and converts into a video data and checks a recording environment including focus, exposure and lighting of the video data and controls the operation of the optical system 10 or the CCD 11. In addition, the encryption processor 80 converts the video data including luminance and color difference signal of an object into a video data having a format such as AVI or MPEG through an encoding process and converts the video data into an encrypted video data through a certain encryption algorithm.

Figure 9:
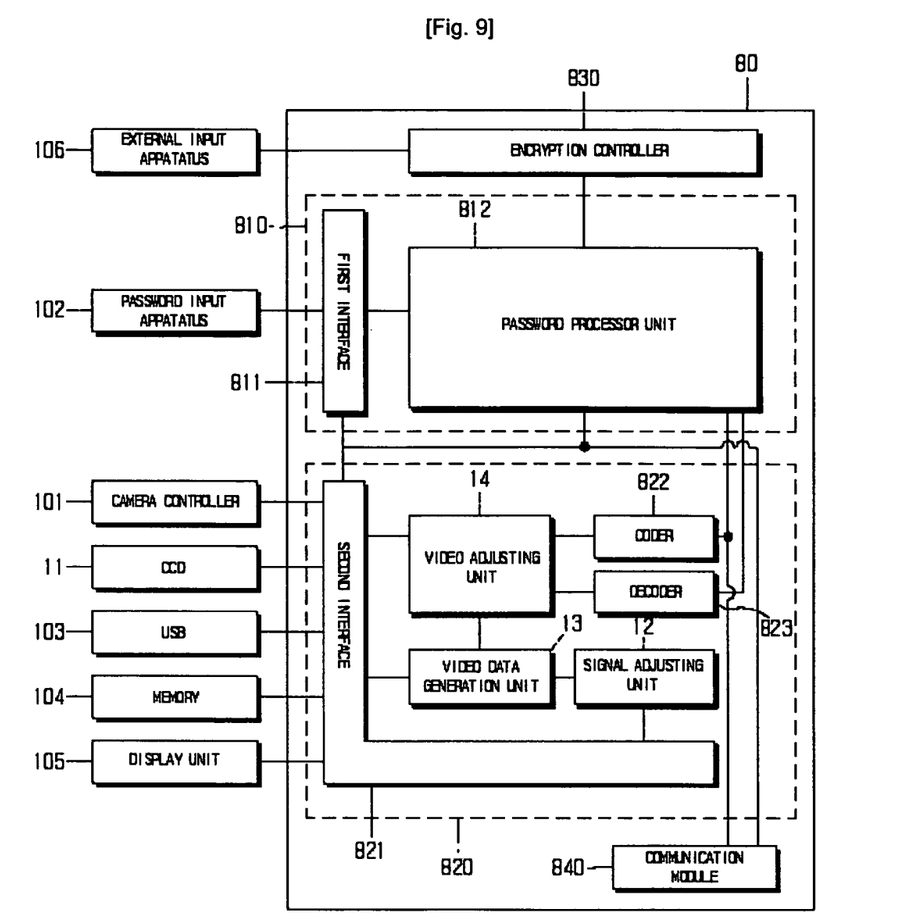
FIG. 9 is a view illustrating a construction of an encryption processor provided at a digital camera according to a fifth embodiment of the present invention

FIG. 10 is a view illustrating a construction of an encryption processor 80 provided at a digital camera according to a fifth environment of the present invention. As shown in FIG. 9, the encryption processor 80 is formed of a single chip and includes an encryption module 810 and a video process module 820.

The encryption module 810 of FIG. 9 is the same as the encryption module 510 of FIG. 3 in their constructions and functions. The detailed descriptions of the encryption module 810 will be referred to the encryption module 510 of FIG. 2 and will be omitted.

The video process module 820 includes a second interface 821 which manages the connection of the input and output apparatus including a camera controller 101, a memory 104, a USB 103, a display unit 105 and a CCD 11. The video process module 720 further includes a signal adjusting unit 12 which removes the noises from the electric signal from each pixel, a video data generation unit 13 which converts the electrical signal from the signal adjusting unit 12 into a video data including luminance and color difference signal of an object, a video adjusting unit 14 which adjusts the recording environment including focus, exposure and lighting of the video data, a coder 622 which compresses the video data into a certain format, and a decoder 623 which decompresses the compressed video data.

Namely, the encryption processor 70 according to a fifth embodiment of the present invention further includes a signal compensation unit 12, a video data generation unit 13 and a video adjusting unit 14 and is formed of an independent chip. The basic functions and structures are the same as the second embodiment of the present invention except for the above difference constructions.

Figure 10:
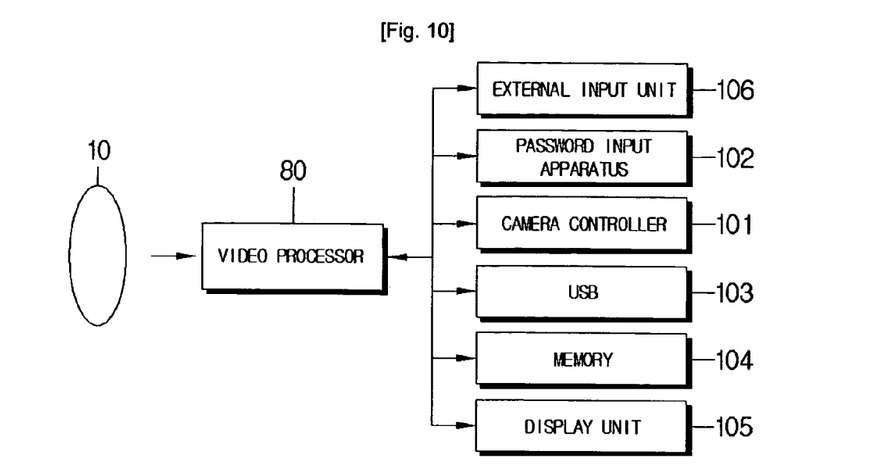
FIG. 10 is a view illustrating a construction of a digital camera according to a sixth embodiment of the present invention.

FIG. 10 is a view illustrating a construction of a camera according to a sixth embodiment of the present invention. As shown therein, the camera according to the sixth embodiment of the present invention includes an optical system 10 and an encryption processor 90.

Since the optical system 10 of FIG. 10 has the same structures and functions as the optical system 10 of FIG. 2, the same reference numerals are given. The detailed descriptions will be omitted.

The encryption processor 90 is formed of an independent chip for processing video data and converts reflection light incident from each pixel into an electric signal and removes noises from the electric signal and converts the electric signal into a video signal. The encryption processor 90 compensates a recording environment information including focus, exposure and lighting of the video data. The encryption processor 90 converts a video data including luminance and color difference signal of an object into a video data having a format such as AVI or MPEG through a data encoding process and converts the video data into an encrypted video data through a certain encryption algorithm.

Figure 11:
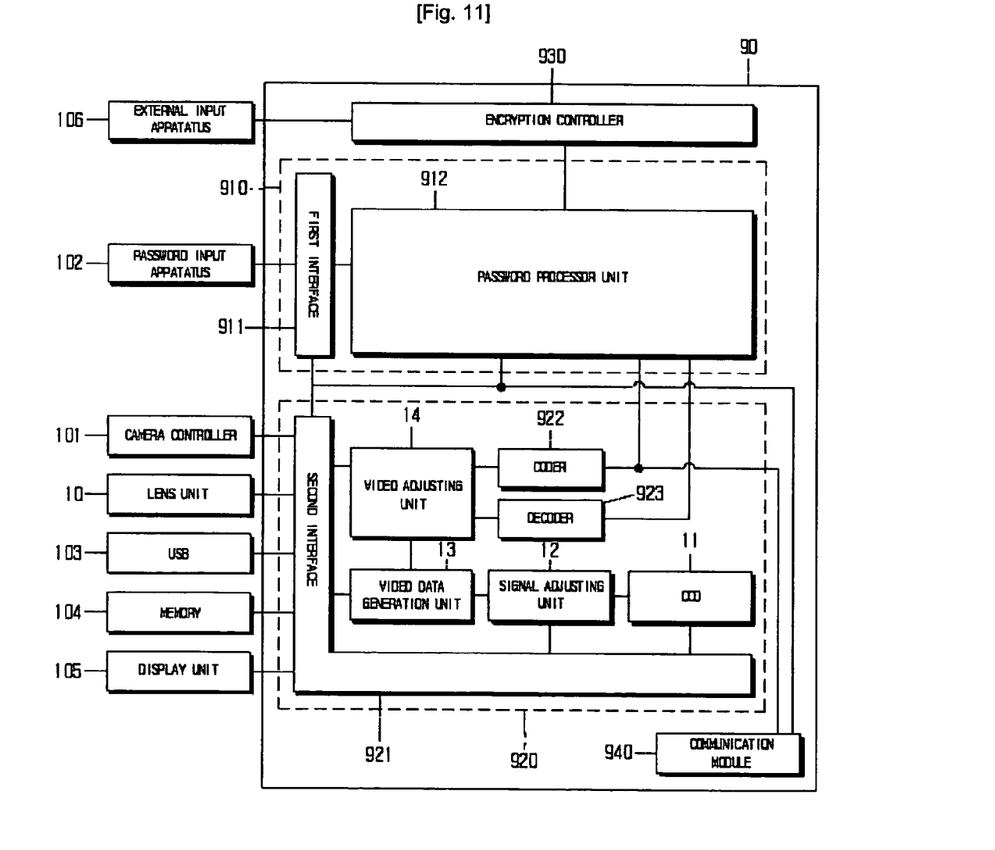
FIG. 11 is a view illustrating a construction of an encryption processor provided at a digital camera according to a sixth embodiment of the present invention.

FIG. 11 is a view illustrating a construction of an encryption processor 90 provided at a digital camera according to a sixth embodiment of the present invention. As shown in FIG. 11, the encryption processor 90 according to a sixth embodiment of the present invention is formed of a single chip and includes an encryption module 910 and a video process module 920.

The encryption 910 of FIG. 11 is the same as the encryption module 510 of FIG. 3 in their constructions and functions. Therefore, the detailed descriptions of the encryption module 910 will be referred to the encryption module 510 of FIG. 3 and will be omitted.

The video process module 820 includes a second interface 921 which manages the connection of the input and output apparatus including a camera controller 101, a memory 104, a USB 103, and a display unit 105. The video process module 820 further includes a CCD 11 which converts a reflection light incident through the optical system 10 into an electric signal, a signal compensation unit 12 which removes the noises from the electric signal from each pixel, a video data generation unit 13 which converts the electrical signal from the signal compensation unit 12 into a video data including luminance and color difference signal of an object, a video adjusting unit 14 which adjusts the recording environment including focus, exposure and lighting of the video data, a coder 622 which compresses the video data into a certain format, and a decoder 623 which decompresses the compressed video data.

Namely, the encryption processor 90 according to a sixth embodiment of the present invention further includes a CCD 11, a signal compensation unit 12, a video data generation unit 13 and a video adjusting unit 14 of the second embodiment of the present invention and is formed of a single chip. The basic functions and structures of the remaining other elements are the same as the second embodiment of the present invention except for the above different elements.

INDUSTRIAL APPLICABILITY

As described above, an encryption processor and a digital camera using the same according to the present invention have the following advantages.

First, it is possible to basically prevent the leakage of digital data. Only a verified apparatus can access the data.

Second, an external leakage of the data can be prevented by encrypting the data, so that a data security can be assured based on a user verification system.

Third, since the maintenance of a password is achieved through an external interface such as an external verification token, etc., it is possible to prevent hacking and security leakage by an apparatus manufacturer or OS manufacturer.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. An encryption processor that connects externally to a data input and to an output apparatus and which mediates an encrypted communication between the same, the encryption processor comprising:

an encryption interface that connects externally to the data input, to the output apparatus, and to a password input unit;

a password process unit connected to the encryption interface         which receives a password from the password input unit via the encryption interface and         which receives externally inputted data from the data input via the encryption interface and         which encrypts the externally inputted data based on a certain encryption algorithm selected from the password and         which detects an abnormal signal and subsequently deletes encrypted data in response to the detected abnormal signal; and     a memory unit which stores a program corresponding to the encryption algorithm and temporarily stores a data generated during an encryption process, wherein the above encryption processor, password process unit and memory unit are integrated into one independent chip.

2. An encryption processor comprising:

a video process module which includes:

a second interface for managing a connection to a video data input unit and to a video output apparatus;

a coder for compressing the externally inputted video data into a certain format; and a decoder for decompressing the compressed video data; and an encryption module which includes:

an encryption interface for managing a connection of an externally connected video data input unit, a password input unit, and the video output apparatus; and a password process unit for encrypting video data from the video data input unit via the encryption interface by using a certain encryption algorithm selected by using a password received from the password input unit via the encryption interface, and for decoding the encrypted video data using a certain decoding algorithm corresponding to the encryption algorithm, and for detecting an abnormal signal and subsequently deleting encrypted data in response to detecting the abnormal signal, wherein the encryption processor is integrated into a single independent chip.

3. An encryption processor comprising:

a video process module which includes:

a second interface for managing a connection of an externally connected input unit and an output apparatus, a video adjusting unit for adjusting a recording environment including a focus, exposure and lighting of an externally received video data, and for adjusting a coder for compressing the video data into a certain format, and a decoder for decompressing the compressed video data; and an encryption module which includes:

a encryption interface for managing a connection of the input unit, the output apparatus, and a password input apparatus;

a password process unit connected to the encryption interface, the password process unit for receiving a password from the video process module via the encryption interface, for encrypting the video data using a certain encryption algorithm by using the received password to select the encryption algorithm, for detecting an abnormal signal, for deleting encrypted data in response to detecting the abnormal signal, and for decoding the encrypted video data using the certain decoding algorithm corresponding to the encryption algorithm based on the received password, wherein the encryption processor is integrated into one independent chip.

4. An encryption processor comprising:

a video process module which includes:

a second interface for managing a connection of an externally connected input and output apparatus, a video data generation unit for converting an externally inputted electric signal into a video data, a video adjusting unit for adjusting a recording environment including a focus, exposure and lighting of the video data, a coder for compressing the video data into a certain format, and a decoder for decompressing the compressed data; an encryption module which includes:

an encryption interface for managing a connection of an externally connected input and output apparatus of the video process module and for connection to a password input apparatus, and a password process unit for receiving a password form the password input apparatus, for selecting a certain encryption algorithm based on the received password, for encrypting the video data using a certain encryption algorithm and decoding the encrypted video data using a certain decoding algorithm corresponding to the encryption algorithm, for detecting an abnormal signal, and for deleting encrypted data in response to detecting the abnormal signal, wherein the above video process module and encryption module are integrated into one independent chip.

5. An encryption processor comprising:

a video process module which includes:

a second interface for managing a connection of an externally connected input and output apparatus, a signal compensation unit for removing noise from an externally inputted electric signal and for compensating the inputted electric signal in response to the noise, a video data generation unit for converting the electric signal into a video data, a video adjusting unit for adjusting a recording environment including a focus, exposure and lighting of the video data, a coder for compressing the video data into a certain format, and a decoder for decompressing the compressed video data; and an encryption module which includes:

an encryption interface for managing the connection of the externally connected input and output apparatus, and for receiving a password from a password input apparatus, and a password process unit for receiving a password from a password input apparatus via the encryption interface, for selecting a certain encryption algorithm based on the received password, for encrypting the video data using the certain encryption algorithm and for decoding the encrypted video data using the certain decoding algorithm corresponding to the encryption algorithm, for detecting an abnormal signal, and for deleting encrypted data in response to detecting the abnormal signal, wherein the above video process module and encryption module are integrated into one independent chip.

6. An encryption processor comprising:

a video process module which includes:

a second interface for managing a connection of an externally connected input and output apparatus, a charge coupled device (CCD) for converting an externally inputted light signal into an electric signal, a signal compensation unit for removing noise from the electric signal from the CCD and for compensating the noise removed electric signal, a video data generation unit for converting the noise removed electric signal into a video data, a video adjusting unit for adjusting a recording environment including a focus, exposure and lighting of the video data by controlling the CCD or the signal compensation unit, a coder for compressing the video data into a certain format, and a decoder for decompressing the compressed video data; and an encryption module which includes:

an encryption interface for managing a connection of an externally connected input and output apparatus, and a password process unit
for receiving a password from a password input apparatus via the encryption interface,
for selecting a certain encryption algorithm based on the received password,
for encrypting the video data using the certain encryption algorithm based on the received password,
for decoding the encrypted video data using the certain decoding algorithm corresponding to the encryption algorithm based on the received password,
for detecting an abnormal signal, and
for deleting encrypted data in response to detecting the abnormal signal, wherein the above video process module and encryption module are integrated into one independent chip.

7. The apparatus of one among claims 1 through claim 6, further comprising an encryption controller for externally receiving a signal with respect to an operation state of the password process unit and for controlling an operation of the password process unit, wherein the encryption controller is adapted to control a size of a password used for an encryption or an encryption operation mode.

8. The apparatus of one among claim 1 through claim 6, further comprising a communication module for transferring an internally converted data or a generated data through an internally connected communication network.

9. The apparatus of one among claim 1 through claim 6, wherein password process unit detects the externally received abnormal signal and deletes a certain data for a data encryption corresponding to the abnormal signal receipt and an encrypted video data.

10. The apparatus of one among claim 2 through claim 6, wherein the password is a personal identification number (PIN) password.

11. The apparatus of one among claim 2 through claim 6, wherein the encryption algorithm is selected from the group consisting of Electronic Code Book (EBC), Cipher Block Chaining (CBC), Cipher Feed Back (CFB), and Output Feed Back (OFB).

12. The apparatus of one among claim 2 through claim 6, wherein said password process unit selects an encryption mode selected from the group consisting of Electronic Code Book (EBC), Cipher Block Chaining (CBC), Cipher Feed Back (CFB), Output Feed Back (OFB) when the password process unit uses a plurality of encryption modes.

* * * * *